Figure 1:
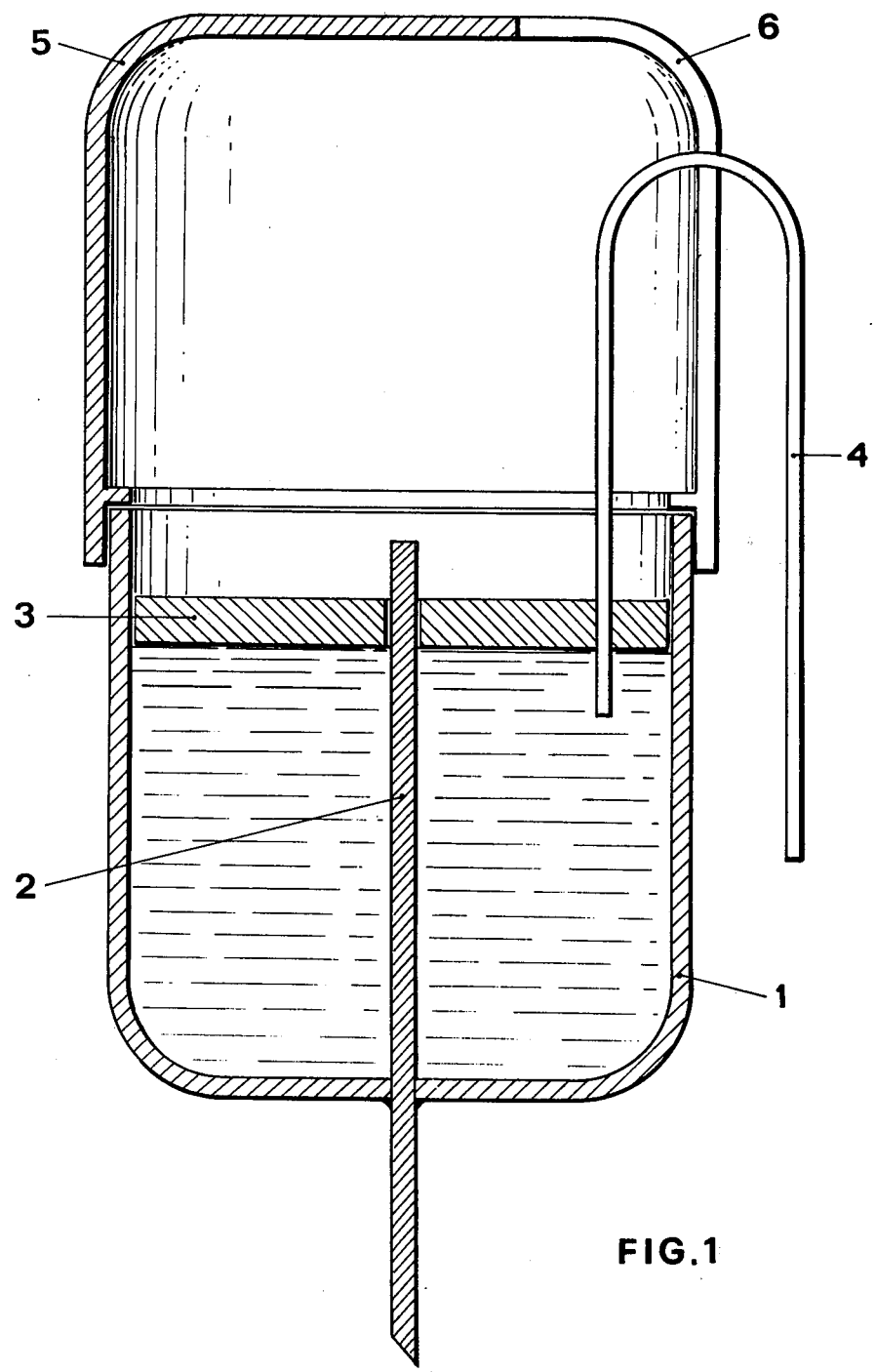

United States Patent [19]
Gubbiotti

[11] 4,223,837
[45] Sep. 23, 1980

[54] DOSED DELIVERY DEVICE FOR LIQUIDS, PARTICULARLY FOR DELIVERING WATER TO VEGETAL CULTIVATIONS

[75] Inventor: Lino Gubbiotti, Perugia, Italy
[73] Assignee: Brevetti Umbria S.r.l., Perugia, Italy
[21] Appl. No.: 934,089
[22] Filed: Aug. 15, 1978
[30] Foreign Application Priority Data Sep. 14, 1977 [IT] Italy .................................. 51010 A/77

[51] Int. Cl.³ ...................... A01G 25/00; A01G 27/00
[52] U.S. Cl. ........................................ 239/50; 47/48.5; 47/81; 137/152; 137/578; 222/187; 239/276
[58] Field of Search .................... 239/44–51.5, 239/145, 271, 276; 47/48.5, 79–81, DIG. 4; 222/187, 416; 137/152, 578; 261/99, 104, 107

[56] References Cited
U.S. PATENT DOCUMENTS

| | | | |
|---|---|---|---|
| 809,014 | 1/1906 | Rose | 239/46 |
| 940,921 | 11/1909 | Byer | 239/45 |
| 976,076 | 11/1910 | von Haxthausen | 239/51 X |
| 1,477,183 | 12/1923 | Newman | 239/46 |
| 1,842,687 | 1/1932 | Reynolds | 47/79 X |
| 2,495,230 | 1/1950 | Day et al. | 137/578 |
| 2,837,867 | 6/1958 | Courtenay | 47/80 |

FOREIGN PATENT DOCUMENTS 1504699 10/1967 France ............................ 47/80

*Primary Examiner*—Andres Kashnikow
*Attorney, Agent, or Firm*—Mason, Fenwick & Lawrence

[57] ABSTRACT

A liquid dispensing device includes a tank, a floating body, a U-shaped tubular capillary syphon mounted in the floating body for vertical adjustment with respect to the floating body with an inlet end extending beneath the floating body and a discharge end for delivering liquid from the tank. In a second embodiment, the discharge end of the capillary syphon discharges into a vertical hollow tube inside the tank open at its bottom and on which the float member is positioned for guided movement.

2 Claims, 4 Drawing Figures

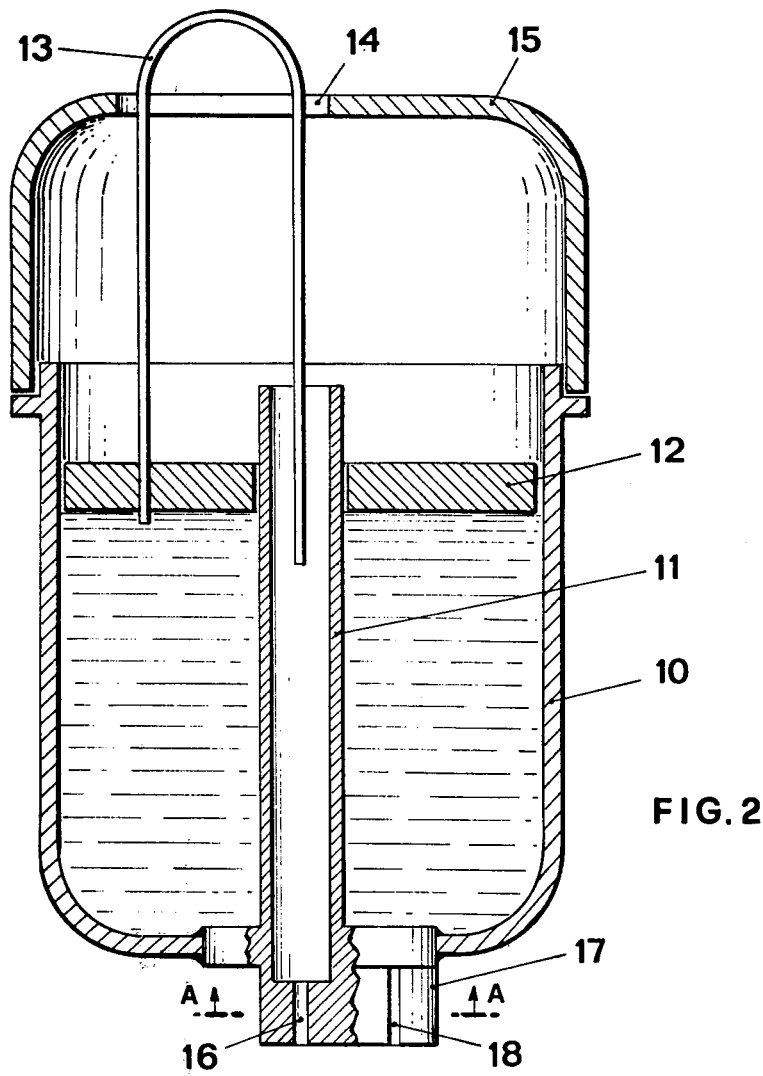
FIG. 2
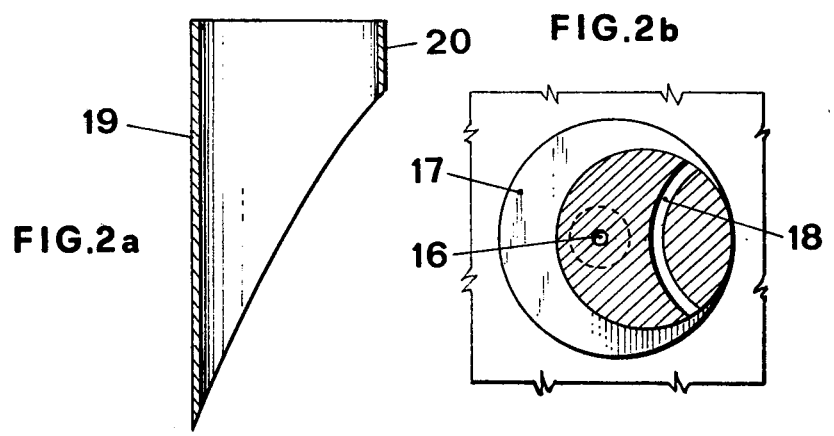
FIG. 2a
FIG. 2b

DOSED DELIVERY DEVICE FOR LIQUIDS, PARTICULARLY FOR DELIVERING WATER TO VEGETAL CULTIVATIONS

The present invention relates to a device for delivering liquids in a prefixed and constant rate. Particularly, this invention relates to a device destined to supply constantly and continuously a pre-fixed amount of water to a vegetal cultivation, so as to maintain in the cultivation itself an optimum amount of moisture.

The purpose of this invention is that of embodying a device of the related kind, simply planned, having a low cost and a simply operating, capable of automatically delivering an amount of whatsoever liquid in a continuous and controlled way.

According to a first embodiment of this invention, a device is provided comprising in combination: a reservoir or tank carried by a support, and containing the liquid to be delivered, a floating body mounted inside the reservoir and vertically slidable depending upon the level variations of the liquid, and at least a syphon shaped capillary, one end of which dips into the liquid, passing through said floating body, while the other end is located outside in order to deliver the liquid itself.

In a second embodiment, said capillary is arranged to have an outlet into a tubular element forming the guide of the floating body, so that the delivery of the liquid will occur within the support itself of the liquid delivery device.

The present invention will be now described with reference to two preferred embodiments thereof, disclosed by way of non limitative examples, and with reference to the attached drawings wherein:

The FIG. 1 shows a first embodiment of the delivery device according to this invention, with a capillary leading outside of the container;

the FIG. 2 shows a second embodiment of the delivery device with the capillary leading inside of the container, the FIG. 2a shows a ground penetrating fitting to be used with the delivery device; and the FIG. 2b shows a cross-sectional view taken along line A—A of FIG. 2.

With reference to FIG. 1, the device consists of a tank 1 which is rigidly connected to a rod 2 internal to and co-axial with the tank itself; preferably, one part of the rod 2 projects outside from the bottom of the tank and serves the function of fixing the device to the plant to be watered; along the rod 2 freely slides a floating body 3 provided with a central bore. The float 3 is provided also with an eccentric bore into which is received and rigid with the float itself, a syphon-like shaped capillary 4.

Finally, the device includes the cover 5 provided with a slot 6 through which passes the capillary issuing from the tank.

The operation is as follows: the capillary 4 establishes a continuous flow of water from the tank 1 to outside causing the water to drop onto the plant to be watered. Due to this delivery, the level of the water within the receptacle diminishes causing the downward movement of the float 3 and of the capillary 4 rigid therewith. As the capillary syphon 4 will be immersed always at the same depth, the flow of water thereby established will remain constant in the time. In order to adjust the amount of water delivered in the unity of time from the device it will be sufficient to change the depth of immersion of the end of the capillary in the water. Of course, more than one capillary 4 can be provided in order to deliver simultaneously the water to more plants.

With reference to FIG. 2, a second embodiment of the delivery device will be now described.

In this second embodiment, the liquid delivery device includes a tank 10 having a tubular central guide 11 for the float 12 whereon is fixed a syphon capillary 13 which when the receptacle is full, partially projects from a slot 14 provided through the cover 15.

The outlet of the capillary 13 leads to the inside of the tubular guide 11 and the liquid passes through said guide outflowing through the aperture 16 provided through the support 17 rigid with the bottom of the receptacle 10.

The support 17 is provided with a slot 18 (see also FIG. 2b) serving for mounting the delivery device on a tubular stem (not shown) as frequently used in a group of ornamental plants so that the delivered liquid will flow along the surface, usually coated with moss, of the tubular stem.

Alternatively, the delivery device can be driven into the ground by tubular fitting 19 obliquely cut, which is fastened by its sleeve 20 to the support 17 of the receptacle.

The preceding description relates to the delivery of water to a plant in a vase or in the ground, but it will be evident, as aforesaid, that the device according to this invention can be applied in all cases wherein it will be necessary to deliver whatever liquid in a prefixed and constant amount.

The present invention has been described with reference to preferred embodiments thereof, being however understood that constructive changes might be practically adopted without thereby departing from the scope of the present industrial privilege.

What we claim is:

1. A liquid delivery device comprising a tank containing liquid to be delivered, a hollow support member for said tank, said hollow support member being inserted in a tubular support element having an obliquely cut lower end portion, a float located in said liquid for vertical movement in the tank to follow the liquid level therein and at least one syphon capillary having a discharge end positioned in said hollow support member and an inlet end immersed in said liquid, said syphon capillary being positioned on said float for vertical adjustment with respect thereto for effecting a variation in the delivery rate of liquid by the syphon capillary.

2. A liquid delivery device comprising a tank containing liquid to be delivered, a float located in said liquid for vertical movement in the tank to follow the liquid level therein, at least one syphon capillary having an inlet end immersed in said liquid and positioned on said float for vertical adjustment with respect thereto for effecting a variation in the delivery rate of liquid by the syphon capillary, a cover provided on said tank, a slot in said cover through which said syphon capillary extends, said syphon capillary including a discharge end positioned internally of the periphery of said tank and a hollow tubular guide member positioned internally of said tank in vertical orientation extending through an aperture in said float means with said discharge end of said syphon capillary being positioned internally of said hollow tubular member.

* * * * *